United States Patent

[11] 3,627,185

[72] Inventor James R. Trammell
Parma Heights, Ohio

[21] Appl. No. 585
[22] Filed Jan. 5, 1970
[45] Patented Dec. 14, 1971

[73] Assignee Scanfax Systems Corporation
New York, N.Y.

[54] TAPE RECORDING SYSTEM MECHANISM
4 Claims, 8 Drawing Figs.

[52] U.S. Cl. .......... 226/90, 274/4 E, 179/100.2 Z
[51] Int. Cl. .......... G11b 15/66
[50] Field of Search .......... 226/90, 180, 118, 89; 242/197, 198, 199, 200; 274/4 E, 4 C; 179/100.2 Z

[56] References Cited

UNITED STATES PATENTS 3,417,938 12/1968 Markakis et al. .......... 179/100.2 Z

*Primary Examiner*—Allen N. Knowles
*Attorney*—Amster & Rothstein

ABSTRACT: A pinch roller positioning mechanism for use in a tape recording system is described as including a linear cam having a cam extension, a spring detent and a latch, all affixed to a cassette-receiving module for controlling the motion of a pinch roller with respect to a capstan shaft and a recording tape in a desired loading sequence. The control is in response to the loaded and unloaded condition of the cassette-receiving module and the position of the cassette-receiving module with respect to the system operational panel, so that the pinch roller is in contact with the tape and capstan shaft only when the cassette-receiving module is loaded and the cassette-receiving module is in a position within a few degrees of being parallel to the panel.

INVENTOR.
JAMES R. TRAMMELL
BY Amster & Rothstein
ATTORNEYS

INVENTOR.
JAMES R. TRAMMELL
BY Amster & Rothstein
ATTORNEYS

TAPE RECORDING SYSTEM MECHANISM

This invention relates primarily to tape recording systems and more particularly to pinch roller positioning mechanisms for establishing an operational relationship between a pinch roller and a capstan shaft with a recording tape for the system therebetween at a desired point in the loading, unloading and operation sequence of the system.

The present invention is particularly useful with an apparatus and method for the preparation and transmission of audio information from an origin location to a first remote location (normally a library or other convenient depository), and then, in multiple copies of such audio information, the dissemination thereof to a plurality of further remote locations. To more particularly describe this method of information flow, the contemplated origin location is a recording studio with the necessary recording equipment for reproducing audio information on master tapes. The audio information which is recorded may be in the form of a lecturer reading from a written manuscript, or the like. Following the recording of individual master tapes at the recording studio, the tapes are packaged in protective cassettes and placed in a convenient depository (such as a library) to reproduce the information of the master tapes onto so-called "slave" tapes. A recording system capable of accommodating at least one, and preferably more slave tapes in cassettes is provided for recording the program of a selected master tape at the depository (library). Such a system enables wide dissemination of audio information. The slave recordings are produced in cassettes and may then be reproduced or played back at further remote locations.

The invention, as described herein, is particularly useful in a recording system for producing multiple slave tape recordings from a master at the library location. It is essential that all tapes (masters and slaves) not be prematurely contacted and therefore damaged by the pinch roller. In keeping with this purpose of avoiding premature contact, it is advantageous to sequence the desired operational relationship between the pinch roller and the capstan shafts with tape therebetween, such that initial contact between the pinch roller, tape and capstan shaft be made only at the precise time just before a recording operation commences. According to the construction recommended for a system as described herein, the tape cassettes are inserted to cassette-receiving modules, while they are lifted from their parallel position with respect to a system operational panel. After loading, the cassette-receiving modules and cassettes are lowered from their angularized position to once again assume a position parallel to that panel. Only at the point when the module is within a few degrees of a position parallel to the panel, does the driving capstan shaft, which protrudes from the operational panel, project into the cassette behind the tape so that the tape may be wedged between the pinch roller and the capstan shaft. Premature pressure by the pinch roller on the tape would, firstly, block the entry opening for the capstan shaft in the cassette and secondly, crinkle, distort, and otherwise damage the tape.

Accordingly, a primary object of the present invention is to provide an efficient and reliable means by which premature contact between a pinch roller for a recording mechanism and a tape to be recorded (or reproduced) is avoided prior to the commencement of a recording operation.

A further object of the present invention is to provide a mechanism and control means for positioning the pinch roller with respect to a tape, the mechanism being controlled, in turn, by the position of a tape cassette and a cassette-receiving module to which said cassette is inserted.

These and other objects of the present invention are accomplished in accordance with one illustrative embodiment of the present invention by a mechanism for positioning a pinch roller in a cassette-receiving module. The cassette-receiving module is rotatably attached to a system operational panel such that it is capable of assuming two positions with respect thereto, parallel, with or without a cassette inserted thereto and angular, with or without a cassette inserted thereto. The parallel position (or within a few degrees thereof) with the cassette fully inserted thereto is the only position in which it is desired to have a pinch roller in contact with a tape in the cassette, since this is the desired recording position and condition, and at that point, the capstan shaft of the system backs the tape. The mechanism in accordance with the present invention is provided to control the position of the pinch roller in response to the above conditions and positions of the cassette-receiving module such that the desired contact between pinch roller, capstan shaft and tape is only attained when the recording position and condition of the cassette-receiving module is obtained.

The above brief description, as well as further objects, features and advantages of the present invention will be more fully appreciated by reference to the following detailed description of the preferred, but nonetheless illustrative embodiment when taken in conjunction with the accompanying drawings, wherein.

Figures 1, 2:
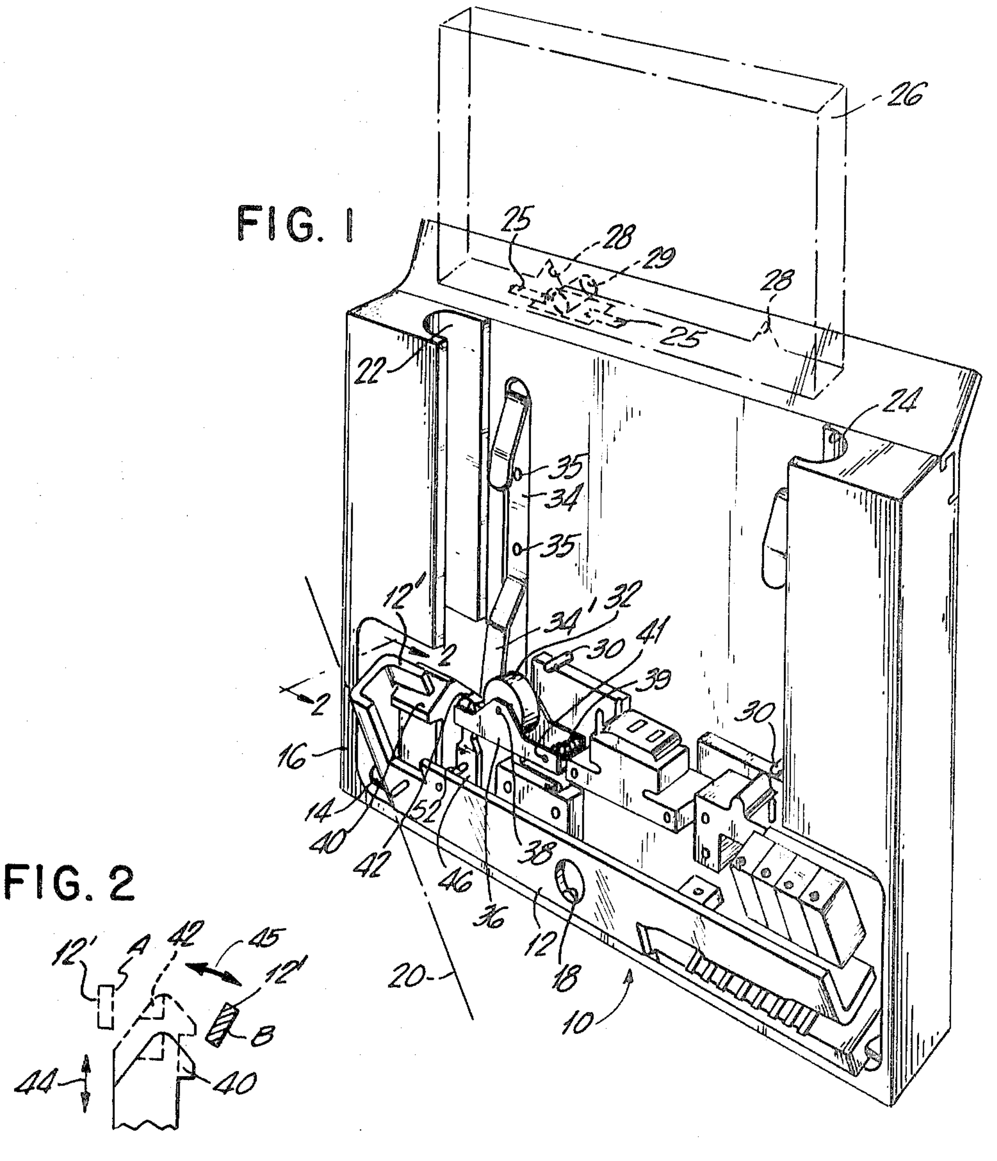
FIG. 1 is a perspective view of a cassette-receiving module and a mechanism according to the present invention included therein.
FIG. 2 is a partial, sectional view of a linear cam and cam driver, taken along the line 2—2 of FIG. 1, for use in the mechanism of the present invention.
Figure 3:
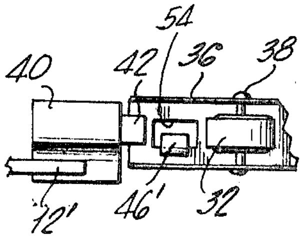
Figure 4:
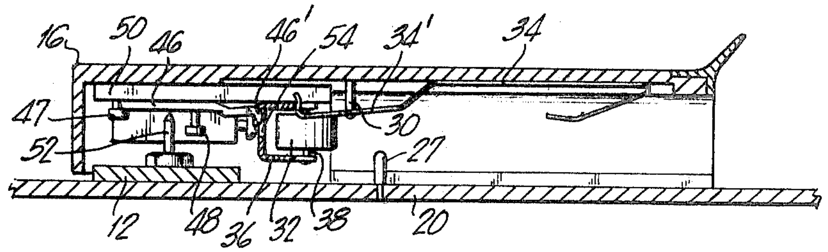
Figure 5:
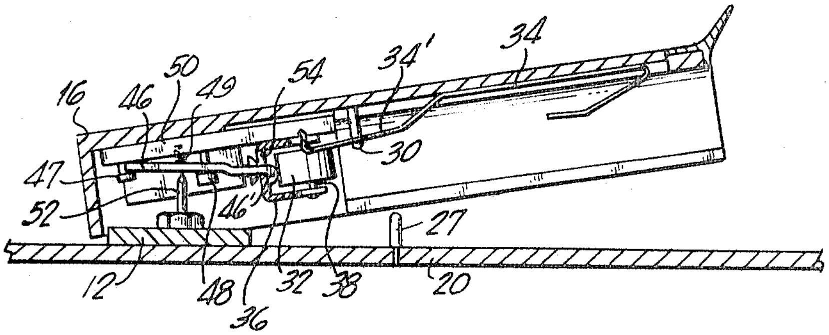
Figure 6:
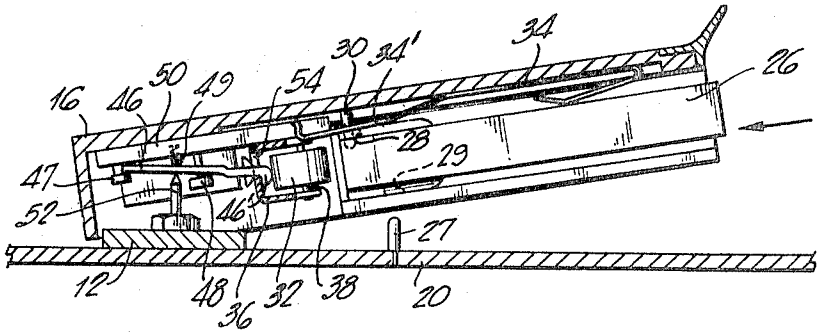
Figure 7:
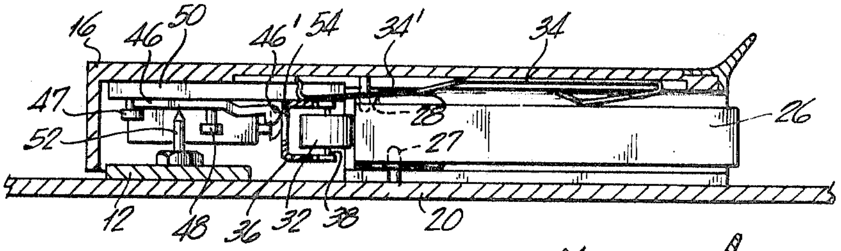
Figure 8:
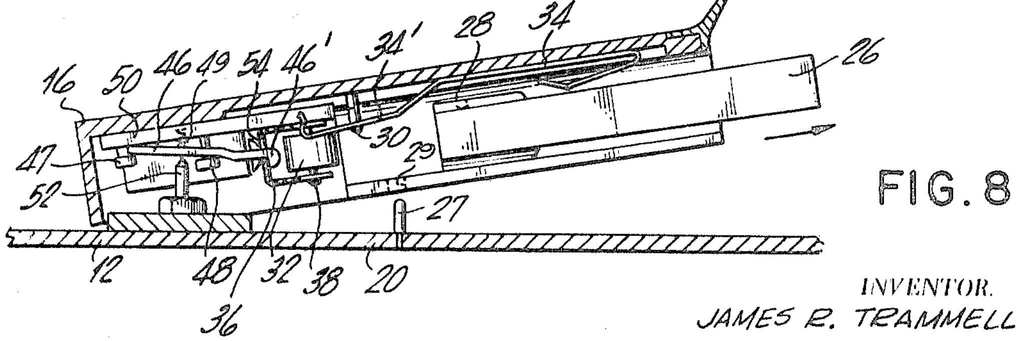

FIG. 3 is a partial, top view of the cam and cam driver of FIG. 2 in relation to a pinch roller and pinch roller channel useful in the present invention; and FIG. 4 through 8 are side-sectional views of various positions and conditions of a cassette-receiving module and a mechanism according to the present invention, with FIG. 4 representing the parallel position with respect to the operational panel before the cassette is inserted thereto, FIG. 5 representing the angular position with respect to the operational panel before the cassette is inserted, FIG. 6 representing the angular position after the cassette is inserted, FIG. 7 representing the parallel position after the cassette is inserted, and FIG. 8 representing the angular position during unloading of the cassette.

Referring specifically to the drawings, and in particular FIG. 1, a cassette-receiving module, generally designated 10, is shown in a rotated position relative to the positions it can normally attain for the purposes of clarity. The cassette-receiving module is supported on its base 12 by means of shaft 14, which is affixed to the base 12 and rotatable relative to the module body 16. The base 12, during operation is affixed to the system operational panel represented by the broken line 20. Of course, as stated previously, both the base 12 and the operational panel 20 are intended to be disposed horizontally and parallel to each other during operation of the system. The opening 18, defined by the base 12, is for clearance of an idler shaft.

The module body 16 defines a receptacle including channels 22, 24 for insertion of the cassette 26 represented by the ghost line in FIG. 1. Slave tape cassettes, as distinguished from master cassettes, as described previously, are constructed to define notches 28 for mating with locating pins 30 extending from the module body 16 in its receptacle. This mating relationship blocks master tape cassettes from attaining a fully loaded position and conversely allows such a position with respect to slave cassettes. As will be seen from the following detailed description of a mechanism according to the present invention, the fully loaded position is necessary to attain contact for recording between a pinch roller and the tape to be recorded. However, the present invention is useful with both masters and slaves, the only difference being the presence or absence of pins 30 in the module. As may be seen, particularly by reference to FIG. 1 and FIGS. 4 through 8, the sequence of the loading operation for cassette 26 is such that a capstan shaft 27, projecting from the operational panel 20, becomes inserted to an opening 29 defined by the cassette 26 only after insertion of the cassette 26 to the cassette-receiving module 16 and after deangularization of the cassette-receiving module body 16. Therefore, it may be seen that pressure exerted on the tape 25 by a pinch roller 32 should only occur when the capstan shaft 27 is in position behind the tape (just before the commencement of a recording operation when module and panel are within a few degrees of each other). In this way, damage to the tape and blockage of the entry opening 29 for the capstan shaft 27 is avoided. Premature pressure by the pinch roller on the tape would cause these problems.

Referring to all of the FIGS. of the drawings, a mechanism according to the present invention is shown to include, for controlling the position of pinch roller 32, a flat spring 34 affixed by attachment means 35 to the module receptacle. The flat spring 34 is constructed and shaped to include detent 34′, which at various times during the mechanism operation as described herein contacts and holds pinch roller channel 36 in a mid position. The pinch roller channel 36 rotatably supports the pinch roller 32 by means of shaft 38, which is fixed with respect to the channel 36 and rotatable relative to the pinch roller 32.

It may be seen that the pinch roller channel 36, and therefore the pinch roller, is attached to the body 16 of the cassette-receiving module and rotates therewith relative to the base 12 and the operational panel 20.

Further, the mechanism includes a linear cam 40 having a cam extension 42 proximate the pinch roller channel 36. The linear cam 40 moves in the direction of arrows 44 of FIG. 2 such that it follows a path parallel to the extension of channel 22 of the receptacle shown in FIG. 1. Such motion is produced by the relative action of cam driver 12′ (with respect to the cam 40) which is an extension of the base 12. Under control of the came driver 12′ and the linear cam 40, the pinch roller channel, and therefore the pinch roller, is selectively caused to assume a fully retracted position relative to the tape in the tape cassette 26. This fully retracted position can also be described as the lowermost position in the receptacle of the module body 16. Without control by this or any other part of the mechanism described or to be described, the pinch roller may assume a normal or tape contacting horizontally disposed position under the action of spring 39 on the shaft 41 about which the pinch roller channel 36 rotates with respect to module body 16.

The mechanism also includes a latch 46 attached to a mechanism mount 50 by attachment means 47 and biased away from the mount 50 by a backing spring 49. The motion of the latch is structurally limited both by the mechanism mount 50 and the head 48 of a motion limiting screw. The motion of the latch 46, according to the present invention, is further confined and controlled by pin 52 which extends from the base 12 of the cassette-receiving module. The latch 46 includes a latch shoulder 46′ which is insertable to an opening 54 defined by the pinch roller channel 36. When the cassette-receiving module body 16 is in its horizontal position with respect to the operational panel 20, the control and action of pin 52 with respect to latch 46 prevents the latch from entering the opening 54. However, in the angular position of the cassette-receiving module body 16 with respect to the operational panel 20, the latch shoulder 46′ enters the opening 54 and locks the pinch roller channel 36 in its fully retracted position. Such locking action by the latch shoulder 46′ and its insertion to the opening 54, are accomplished in cooperation with the attainment by the pinch roller channel 36 of the fully retracted position under the influence of the cam extension 42.

With the mechanism according to the present invention having been described above, for the purposes of clarity in describing the action of such mechanism, a full sequence of operations will now be described with reference to FIGS. 4 through 8, showing the various positions and conditions of the mechanism and cassette-receiving module body 16. The first position and condition is represented by FIG. 4 and includes the cassette-receiving module body 16 in a parallel condition with respect to the operational panel 20. It may be seen from FIG. 4 that the module receptacle is empty and therefore the detent 34′ of flat spring 34 has assumed a blocking position with respect to the pinch roller channel 36 such that the channel is in a mid position. Also in FIG. 4, the latch 46 is held against the mechanism mount 50 by pin 52 attached to the base 12 of the cassette receiving module, so that latch shoulder 46′ is thereby prevented from entering the opening 54.

In FIG. 5, the next step of the loading and recording sequence is shown with the cassette-receiving module body 16 having been lifted to an angular position in relation to the operational panel 20. Before loading of the cassette 26, the mechanism of the present invention has assumed a position such that the latch shoulder 46′ has entered the opening 54 of the pinch roller channel 36, such entrance being enabled by the latch having been lifted from pin 52 through the angularization of the cassette receiving body 16. Also, such entrance has been further facilitated by the motion of the linear cam driver 12′ (FIG. 2) in moving from position A to position B (relative to the cam 40. Actually the cam moves back and forth in directions 45, shown in FIG. 2, as the module is angularized and deangularized) during angularization of the module body 16. Such relative motion by the cam driver 12′ pushes the linear cam 40 downward so that the cam extension 42 retracts the pinch roller channel 36 to its lowermost position in the receptacle of the module body 16, thereby enabling the entry of latch shoulder 46′ to the opening 54. The latch shoulder 46′ then assumes the locking function to hold the pinch holder channel 36 in that fully retracted position.

Referring to FIG. 6, the cassette 26 is inserted to the receptacle of the cassette-receiving module body 16, and since it is a slave cassette, its notches 28 allow its bottoming in the receptacle. Upon moving into the receptacle, the cassette 26 depresses the detent 34′ of the flat spring 34 so that it is no longer in blocking relationship to the pinch roller channel 36.

FIG. 7 represents the position and condition of the mechanism and module body 16 after the module body has been deangularized to assume a parallel position with respect to the operational panel 20. The deangularizatin (to within a few degrees of parallelism between module and panel) has once more caused the pin 52 to depress the latch 46 so that the latch shoulder 46′ is removed from the opening 54. Since neither the latch should 46′ nor the detent 34′ is holding the channel 36 in retracted position, it has moved to recording relationship with respect to the tape in the cassette 26. The capstan shaft 27 having entered opening 29 upon deangularization, the tape is now wedged between shaft 27 and pinch roller 32. The removal of latch shoulder 45′ from opening 54 in going from the position of FIG. 6 to FIG. 7 is facilitated by relative motion of the cam driver 12′ from position B to position A (FIG. 2), which motion depressed the pinch roller channel 36 for a time just long enough for removal of latch shoulder 46′ from opening 54.

After recording, as shown in FIG. 8, the module body 16 is again angularized and during the angularization, the cam driver 12′ has again moved (relative to the cam 40) from position A to position B (FIG. 2). This action, along with the release of pressure by pin 52 on latch 46 has again facilitated entry of the latch shoulder 46′ to the opening 54 so that the pinch roller channel 36 is again locked in its fully retracted position. Removal of the cassette 26 from the receptacle has also released the detent 34′ so that it is again in blocking relationship to the pinch roller channel 36.

The mechanism is now in a position so that the sequence from FIG. 5 through FIG. 8 may be repeated by immediate loading of another cassette or the mechanism may be resequenced through the entire operation of FIG. 4 through FIG. 8.

In accordance with the above description, a mechanism and construction has been described to insure contact between pinch roller and capstan shaft with tape therebetween only at the precise point just before the beginning of the recording operation of a tape recording system.

What is claimed is:

1. A pinch roller positioning mechanism for operation in a cassette-receiving module supported on a tape recording system operational panel, in cooperation with a cassette having recording tape therein, said cassette being insertable to said module, comprising a pinch roller, means for controlling the motion of said pinch roller with respect to said tape, means for moving said module between an angular position and a parallel position with respect to said panel, said mechanism being adapted to provide contact between said tape and said pinch roller only when said cassette is inserted to said module and said module is approximately in said parallel position, said means for controlling including a flat spring having a detent, said detent holding said pinch roller in a mid retracted position with respect to said tape when said module is in said parallel position and without said cassette being inserted to said module.

2. A pinch roller positioning mechanism for operation in a cassette-receiving module supported on a tape recording system operational panel, in cooperation with a cassette having recording tape therein, said cassette being insertable to said module, comprising a pinch roller, means for controlling the motion of said pinch roller with respect to said tape, means for moving said module between an angular position and a parallel position with respect to said panel, said mechanism being adapted to provide contact between said tape and said pinch roller only when said cassette is inserted to said module and said module is approximately in said parallel position, said means for controlling including a latch for holding said pinch roller in a fully retracted position with respect to said tape when said module is in said angular position, said means for controlling further including a linear cam having a cam extension for moving said pinch roller to its fully retracted position in response to motion of said module between its angular and parallel positions.

3. The invention according to claim 2 wherein said means for controlling further includes a cam driver affixed with respect to said operational panel and the responsiveness of said linear cam extension for controlling the motion of said pinch roller is caused by relative motion between said linear cam and said cam driver produced by said motion of said module.

4. A pinch roller positioning mechanism for operation in a cassette-receiving module rotatably supported on a tape recording system operational panel, in cooperation with a notched cassette having recording tape therein, said cassette being insertable to said module, comprising a linear cam having a cam extension whose motion is controlled by the rotation of said module, a pin fixed with respect to said panel and extending generally perpendicularly to said panel, a latch whose motion is in part controlled by said pin and which is affixed at one end to said module, a spring affixed to said module and having a detent, a pinch roller, a pinch roller channel rotatably supporting said pinch roller, the motion of said channel being in part controlled by said detent, in part controlled by said latch, and in part controlled by said cam extension, said mechanism being adapted to provide contact between said tape and said pinch roller only when said notched cassette is in place in said module and said module is rotated to a position parallel to said panel.

* * * * *